United States Patent [19]

Oxley

[11] Patent Number: 4,830,452
[45] Date of Patent: May 16, 1989

[54] OPTICAL SWITCHING SYSTEM

[76] Inventor: Robert F. Oxley, 89a Route de Florissant, 1206 Geneva, Switzerland

[21] Appl. No.: 70,361

[22] Filed: Jul. 7, 1987

[30] Foreign Application Priority Data

Jul. 12, 1986 [GB] United Kingdom ............... 8617050

[51] Int. Cl.$^4$ .................................................. G02B 6/26
[52] U.S. Cl. .............................. 350/96.15; 350/96.10
[58] Field of Search .............. 350/96.10, 96.11, 96.15, 350/96.16, 96.24

[56] References Cited

U.S. PATENT DOCUMENTS

| 3,455,667 | 7/1969 | Snitzer et al. | 350/96.15 |
| 3,455,668 | 7/1969 | Upton | 350/96.15 |
| 3,611,359 | 10/1971 | Panerai et al. | 350/96.15 |

FOREIGN PATENT DOCUMENTS

| 52-2201 | 1/1977 | Japan | 350/96.14 |
| 55-130505 | 10/1980 | Japan | 350/96.20 |
| 56-4103 | 1/1981 | Japan | 350/96.13 |

Primary Examiner—William L. Sikes
Assistant Examiner—Frank González
Attorney, Agent, or Firm—Pravel, Gambrell, Hewitt, Kimball & Krieger

[57] ABSTRACT

An optical routing device comprising a housing block containing a plurality of intersecting holes or other light guides, and at least one control rod which can be selectively introduced into any of said light guides so that a light reflection means, such as a mirror, carried by that rod is brought into a position lying at the intersection of two said light guides, whereby a light beam travelling in one of said intersecting light guides is re-directed into another of said intersecting light guides.

9 Claims, 2 Drawing Sheets

OPTICAL SWITCHING SYSTEM

BACKGROUND OF THE INVENTION

Field of the Invention

The present invention is concerned with a system for enabling programmed switching of optical signals.

SUMMARY OF THE INVENTION

An object of the present invention is to provide a means of preselecting optical switching paths for the programmed routing of optical signals.

According to a first aspect of the present invention, there is provided an optical routing device comprising a housing block containing a plurality of intersecting light guides, and at least one control rod which can be selectively introduced into any of said light guides so that a light reflection means carrier by that rod is brought into a position lying at the intersection of two said light guides, whereby a light beam travelling in one of said intersecting light guides is redirected into another of said intersecting light guides.

According to a second aspect of the present invention, there is provided an optical routing device comprising a housing block (which may be opaque or transparent with a controlled refractive index) containing a plurality of intersecting holes, and at least one control rod which can be selectively introduced into any of said holes so that a mirror carried by that rod is brought into a position lying at the intersection of two said holes, whereby a light beam travelling in one of said intersecting holes is redirected into another of said intersecting holes.

The intersecting holes can lie in any number of planes within the block and can face in any number of directions. Any number of control rods can be used, depending on the complexity of the routing to be achieved.

The control rods can carry several mirrors at different axial positions along the rods for controlling light beams in direction pairs of intersecting holes at different planes within the block. The control rods may also carry other means for controlling the light beams, such as prisms or partially reflecting surfaces which may or may not be covered with a coating so constituted as to reflect fully or in part particular frequencies or band of frequencies, in the visual spectrum, the latter partially reflecting surfaces allowing the light signal to be transmitted in part to another mirror or mirrors (or other means of reflection), thus effectively allowing one signal to be divided and redirected to several outputs.

Since non-coherent or out of phase intersecting light beams can cross one another without interference, a three-dimensional switching arrangement is thus possible which leads to the possibility of the complex control of a large number of light signals within a relatively small volume.

BRIEF DESCRIPTION OF THE DRAWINGS

The invention is described further hereinafter, by way of example, with reference to the accompanying drawings, in which:

FIG. 2b is a section on A—A in FIG. 2a;

DETAILED DESCRIPTION OF THE PREFERRED EMBODIMENTS

Figure 1:
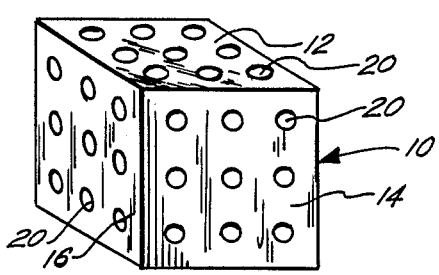
FIG. 1 is a diagrammatic perspective view of the body part of one embodiment of an optical routing device in accordance with the present invention.

Referring first to FIG. 1, the embodiment comprises a solid parallelapiped 10, in this case a cube, which is pierced on its three adjacent faces 12, 14, 16 by respective similar arrays of (in this case) nine through-holes 20. Because of the symmetrical nature and positioning of these holes 20, it will be noted that each hole in a given one of the faces 12, 14, 16 intersects three of the holes in each of the other two faces 12, 14, 16.

Figure 2A:
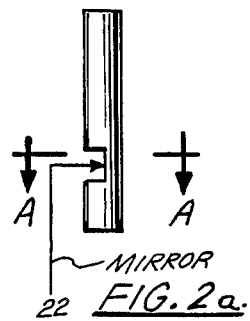
FIG. 2a shows diagrammatically one possible control rod for use with the embodiment of FIG. 1.
Figure 2B:
Figure 3:
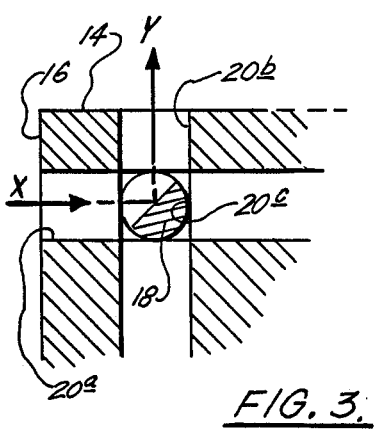
FIG. 3 is a diagrammatic sectional view illustrating the operation of the first embodiment.

A plurality of solid or tubular rods 18 (FIG. 2) are provided, which can be inserted into selected holes 20 in the block 10. Each rod 18 contains one or more cut-away mirrored portions 22 (in this case it has only one such portion) for intercepting a light beam and deflecting it through 90°. This operation is illustrated in FIG. 3 which shows a hole 20a leading from the face 16 intersecting holes 20b and 20c leading from the faces 14 and 18 of the cube 10, respectively. The rod 18 is inserted axially into the hole 20c and is angularly oriented with the hole 20c such that its mirror lies at 45° to the longitudinal axis of both the holes 20a and 20b. Thus, if a light beam X is then directed axially into the hole 20a it will be deflected through 90° so that it leaves axially along the hole 20b (as indicated at Y). Naturally, the same operation is obtained in reverse by directing the signal into the hole 20b whereby the light signal then leaves by the hole 20a. It will be appreciated that by turning the rod 18 through 90° (anti-clockwise in FIG. 3), the light beam entering via the hole 20a could alternatively have been directed in the opposite direction down the hole 20b, possibly to be intercepted by mirrors in rods 18 at other positions or simply so as to leave the block from the other end of hole 20b.

The rods 18 can themselves be transparent or opaque or may consist of a framework to give light unobstructed passage, and are adapted to slide within said holes in the block. Guides may be provided on the rods and/or the block for ensuring accurate alignment of the mirrors with the holes at selected positions.

Each rod 18 can carry one or a plurality of mirrors 22, the mirrors being orientated in the same or different directions, including up and down (i.e. directing incident light axially along the rod for at least part of its length). The rods 18 need not be of circular section, and could, for example, be of square or rectangular section (see FIG. 4a). In the latter cases, if the rod is transparent and the mirror is at 45°, it will be noted that the sides of the rod will present no obstacle to the light transmission in planes above and below the mirror since they will lie perpendicular to incident light beams.

Figures 4A, 4B, 4C:
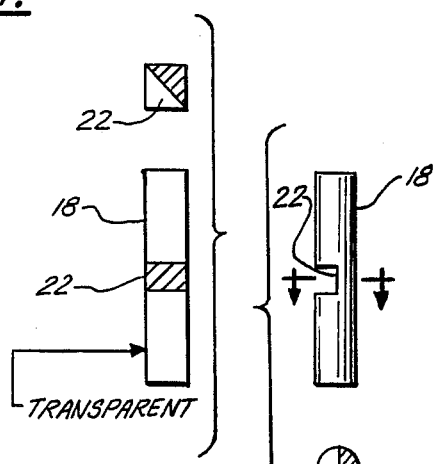
FIGS. 4(a), (b) and (c) show further examples of control rods.

FIG. 4b shows an example of a solid rod 18 of circular section having a single mirror 22. FIG. 4c shows an example of a solid rod 18 of circular section having two mirrors 22a, 22b facing in opposite directions.

Figure 4D:
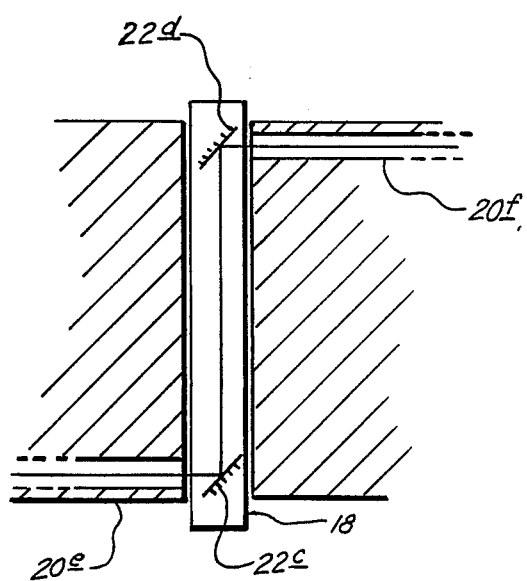
FIG. 4d shows a second embodiment of the present invention.

FIG. 4d shows an example of a transparent rod 18 having two mirrors 22c, 22d disposed at axially separated positions therealong whereby incident light in a first (20e) of the holes 20 in the housing block 10 is transmitted axially along the rod 18 between the two mirrors 22c, 22d before being retransmitted via a second hole 20f in a different but parallel plane to said first hole 20e.

Figure 5:
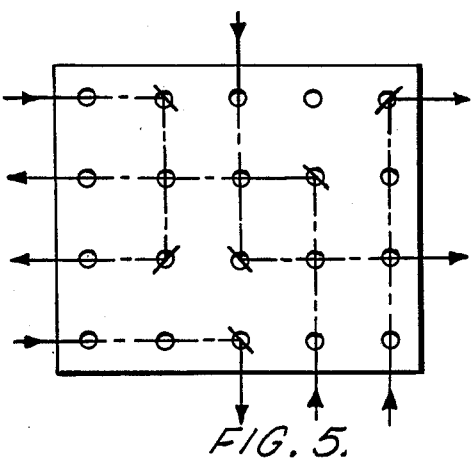
FIG. 5 diagrammatically illustrates a number of possible routing paths in a single plane embodiment.

FIG. 5 shows examples (using just a single switching plane for ease of illustration) of switching capability using the present system. Light beams introduced into the holes in any one of the faces can be routed by the mirrors on the rods 18 so as to leave either by that same face, or any of the other faces. Naturally, by increasing the number of planes, the possible variations for switching increases enormously. This results in one of the principal advantages of the present system, namely that a substantial number of potential routing paths can be available in a relatively small space.

Figure 6:
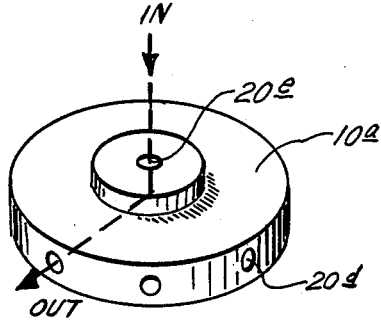
FIG. 6 is a diagrammatic perspective view of the body part of a third embodiment of an optical routing device in accordance with the present invention.

The shape of the block 10 is not limited to a parallelepiped and can be of any suitable configuration, having any number of ports in any of three directions and any number of planes. For example, as shown in FIG. 6, the block can be in the form of a disc 10a having a plurality of radial holes 20d which intersect a central axial hole 20e.

A rod can be inserted into any one of the radial holes 20d containing a mirror 22 which is arranged to lie at the intersection of that hole 20d with the central hole 20e so that light directed into the central hole 20e is redirected by the mirror so as to leave by a selected one of the other radial holes 20d. Alternatively, the hole 20e could receive a rod 18 (not shown) which is transparent and carries a mirror adapted to reflect light (directed axially into the rod) through 90° so as to redirect the light out of any selected hole 20d, depending on the selected angular orientation of the rod 18 in the hole 20e.

Although not discussed herein in detail, means may be necessary for filtering, collimating and otherwise processing the light beams entering and leaving the present system for compatability and matching with external optical systems. For example, the light signals entering and/or leaving the system might be carried in optical fibres and inserted into and led from the block by means of flying optical plug leads.

I claim:

1. An optical routing device comprising a housing block of generally discoidal configuration, means defining a plurality of intersecting light guides within said housing block, at least one control rod which can be selectively introduced into any of said light guides, and a light reflection means carried by said control rod such that, when said control rod is introduced into a selected light guide, said light reflection means carried by that rod is brought into a position lying at the intersection of two said light guides, whereby a light beam travelling in one of said intersecting light guides is re-directed into another of said intersecting light guides.

2. An optical routing device according to claim 1, wherein the intersecting light guides include a plurality of radial holes in said discoidal housing block.

3. An optical routing device according to claim 2 including a further light guide comprising a hole extending axially of the discoidal housing block and intersecting said plurality of radial holes.

4. An optical routing device comprising a housing block of generally, cuboidal configuration, means defining a plurality of intersecting light guides within said housing block, said intersecting light guides comprising holes extending between pairs of opposite faces of the cuboidal housing block, at least one control rod which can be selectively introduced into any of said light guides, and a light reflection means carried by said control rod such that, when said control rod is introduced into a selected light guide, said light reflection means carried by that rod is brought into a position lying at the intersection of two said light guides, whereby a light beam travelling in one of said intersecting light guides is redirected into another of said intersecting light guides.

5. An optical routing device comprising a housing block, means defining a plurality of intersecting light guides within said housing block, at least one control rod which can be selected introduced into any of said light guides, and a light reflection means carried by said control rod such that, when said control rod is introduced into a selected light guide, said light reflection means carried by that rod is brought into a position lying at the intersection of two said light guides, whereby a light beam travelling in one of said intersecting light guides is re-directed into another of said intersecting light guides, at least part of the control rod being transparent to light, two of said light reflection means being disposed at axially separated positions along the length of said transparent part of the control rod, said two said light reflection means being orientated so as to direct incident light, applied to one said light reflection means via a first light guide, axially along the control rod to the other light reflection means where it is re-transmitted via a second light guide.

6. An optical routing device comprising a housing block, means defining a plurality of intersecting holes within said housing block, at least one control rod which can be selectively introduced into any of said holes, and at least one mirror carried by said control rod such that, when said control rod is introduced into a selected light guide, said mirror carried by that rod is brought into a position lying at the intersection of two said holes, whereby a light beam traveling in one of said intersecting holes is re-directed into another of said intersecting holes.

7. An optical routing device according to claim 6, wherein the control rod includes two of said mirrors disposed at axially separated positions therealong whereby incident light in a first of said holes is transmitted axially along the rod between said two mirrors before being re-transmitted via a second hole disposed in a different but parallel plane to said first hole.

8. An optical routing device according to claim 6, wherein the housing block is opaque.

9. An optical routing device according to claim 7, wherein the housing block is made of a material having a controlled refractive index.

* * * * *